United States Patent [19]

McKeown

[11] Patent Number: 4,695,972
[45] Date of Patent: Sep. 22, 1987

[54] CORRELATOR HAVING SPURIOUS SIGNAL CANCELLATION CIRCUITRY

[75] Inventor: James H. A. McKeown, Ipswich, England

[73] Assignee: British Telecommunications Public Limited Company, England

[21] Appl. No.: 737,417

[22] Filed: May 24, 1985

Related U.S. Application Data

[63] Continuation-in-part of Ser. No. 502,755, Jun. 9, 1983, Pat. No. 4,561,067.

[30] Foreign Application Priority Data

Jun. 23, 1982 [GB] United Kingdom ............... 8218166

[51] Int. Cl.$^4$ .............................................. G06G 7/19
[52] U.S. Cl. ..................................... 364/819; 364/604
[58] Field of Search ............... 364/800, 807, 819–824, 364/604, 728, 602, 604, 825; 375/94, 96, 99–102; 455/296, 303, 305–306, 309, 312, 20–23, 146–147, 213, 307, 323; 343/378, 382–384

[56] References Cited

U.S. PATENT DOCUMENTS

| | | | |
|---|---|---|---|
| 3,199,106 | 8/1965 | Karr | 364/823 X |
| 3,416,081 | 12/1968 | Gutleber | 364/819 X |
| 3,700,876 | 10/1972 | Gray | 364/819 X |
| 3,961,172 | 6/1976 | Hutcheon | 364/819 X |
| 4,115,865 | 9/1978 | Beauvais et al. | 364/604 |
| 4,224,679 | 9/1980 | Nossen et al. | 364/728 |
| 4,283,767 | 8/1981 | Rountree | 364/819 X |
| 4,363,129 | 12/1982 | Cohn et al. | 455/22 X |
| 4,449,193 | 5/1984 | Tournois | 364/604 |

FOREIGN PATENT DOCUMENTS 666178  2/1952  United Kingdom ................. 455/22

Primary Examiner—Gary V. Harkcom
Attorney, Agent, or Firm—Nixon & Vanderhye

[57] ABSTRACT

A correlator comprises a mixing stage receiving a low level signal to be correlated and a 500 KHz square wave. The output from the mixer comprises the low level signal coupled with the 500 KHz square wave signal. This output signal is fed to a multiplier for multiplying with the high level signal to be correlated. The output from this stage is fed via ac coupling to a double balanced mixer also receiving the 500 KHz square wave signal. This stage operates to decouple the square wave signal from the input to that stage to produce a dc output signal. In this output signal the effects of the square wave signal on the correlation itself have been cancelled whereas any spurious signals from within the correlator have in effect been multiplied by negative or positive values. Thus, subsequent integration of the dc output signal produces an eventual correlation output wherein the effects of the spurious signals have been substantially reduced by cancellation.

13 Claims, 1 Drawing Figure

CORRELATOR HAVING SPURIOUS SIGNAL CANCELLATION CIRCUITRY

This is a continuation-in-part of application Ser. No. 502,755, filed June 9, 1983, now U.S. Pat. No. 4,561,067.

BACKGROUND OF THE INVENTION

This invention relates to a correlator suitable for use in a circuit for cancellation or reduction of unwanted components in two received signals.

Correlators can be employed in circuits for the cancellation or reduction of unwanted components in two received signals. It is known to make use of complex correlators which comprise simple double balanced mixers. These double balanced mixers correlate a high level signal with a low level signal. However, imperfections in the double balanced mixer give rise to a dc offset voltage at the output which is related to the high level input signal. This dc offset voltage can cause an error in the correlator output and thereby reduce the efficiency of any subsequent process for cancelling unwanted components in the two signals. Furthermore, other spurious signals are also generated within the correlator which further increases errors in the correlator output.

SUMMARY OF THE PRESENT INVENTION

It is an object of the invention to provide an improved correlating circuit which is intended to overcome this problem.

According to the invention there is provided:
a correlator comprising:
first input means for a first signal;
second input means for a second signal;
a source of predetermined ac signals;
first mixer means connected to the first input and said source to mix thereby the first signal and said ac signals in a manner to couple the ac signal to the first signal;
multiplying means connected to the first mixer and to the second input to multiply thereby the mixed signal and the second signal;
second mixer means connected to the multiplier means and to said source to mix thereby the multiplying signal and the said ac signals in a manner to decouple the ac signals from the multiplier signal and to produce an output therefrom.

Preferably, the frequency of the ac signal is substantially lower than the frequency of the first and second signals. Thus, there is a frequency conversion to lower frequencies with a consequent reduction in the leakage problems. Advantageously the source of predetermined ac signals produces a square wave output.

BRIEF DESCRIPTION OF THE DRAWING

An example of the invention will now be described with reference to the accompanying drawing which is a schematic diagram illustrating a correlator embodying the present invention in use.

DETAILED DESCRIPTION OF THE PREFERRED EMBODIMENT

Figure 1:
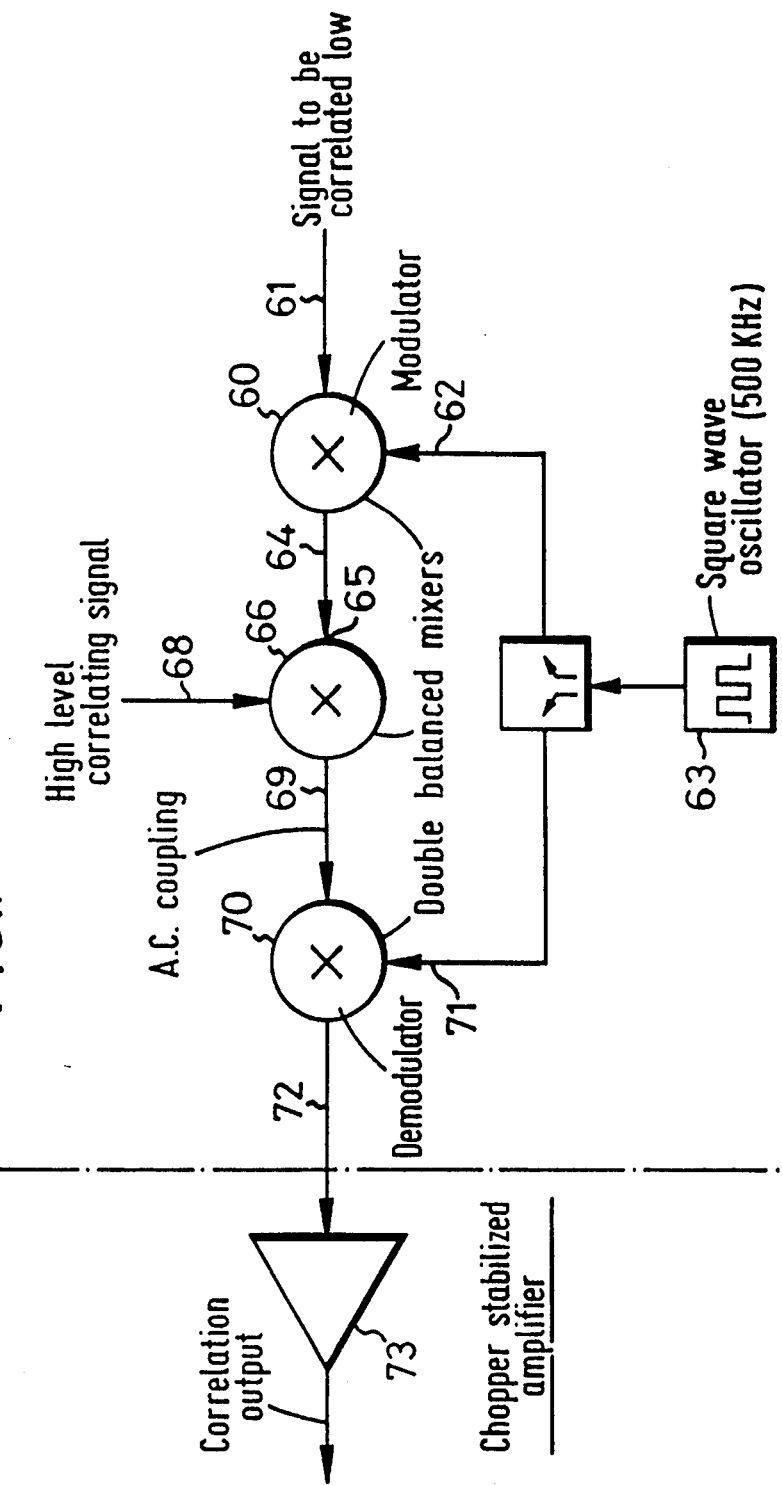

Correlators measure the correlation between two variables. Thus, spurious signals or dc bias within the correlator itself will cause errors in the output of the correlator. In order to avoid this, it is possible mathematically to envisage multiplying the correlator input by a unitary value and multiplying the correlator output by a further unitary value so as to cancel the unitary value applied at the input. As a result, there is no overall effect on the correlation itself, however, any spurious signals are treated in a more random manner. By arranging the application of unitary values to be a plus or minus unitary value, then connection of the correlator output to a stage having an integration effect integrates the output over a number of time periods so that on average any spurious signals will be substantially cancelled to the point of being insignificant without affecting the correlation value itself.

The accompanying figure illustrates how the mathematical concept can be translated into a circuit. The correlator comprises a mixing stage which is constituted by a double balanced mixer 60. The double balanced mixer is a three port device having an input 61 to receive a low level signal which is to be correlated, an input 62 which receives a square wave of 500 KHz from an oscillator 63 and an output 64. The output signal at the output 64 is the low level signal to be correlated which has been coupled with the 500 KHz oscillator signal. The output signal is applied to the input 65 of a second double balanced mixer 66 which acts as a multiplier. The mixer 66 also receives a high level correlating signal at input 68. Thus, the mixer 66 multiplies this signal at input 65 with the high level signal at input 68 and produces an output 69 which is fed by a suitable ac coupling which includes an amplifier (not shown) to a third double balanced mixer 70. The double balanced mixer 70 receives the 500 KHz square wave output from the oscillator 63 at input 71 and operates to decouple the oscillator signal from the input from the mixer 66 to produce a dc output signal at output 72. At this stage, the effects of the oscillator signal on the correlation itself has been cancelled whereas any spurious signals prior to this stage have in effect been multiplied by negative or positive values. Consequently, when this dc output signal is integrated in effect then in the eventual correlation output the effects of the spurious signals have been substantially reduced by cancellation. One way of achieving an integration effect is to feed the output signal to an integrator in the form of a chopper stabilized amplifier 73 to provide the correlation output.

Consequently, the signal appearing from amplifier 73 can be used as a control signal in a circuit for cancelling unwanted components in the two signals. The circuit shown effectively frequency converts the signals to be correlated to a lower frequency thereby reducing considerably the problem produced by leakage of the high level signal to the low level signal.

Typically, the design of the circuit in which the correlator is used includes a stage having a suitable integrating effect for the output of the correlator, for example a low pass filter can be employed or some other circuit where high frequency signals are ignored to give an integrating effect.

The circuit described has been designed to operate with incoming signals having frequencies in the order of 140 MHz although it will be appreciated that the principle of the invention could be applied over a very wide range of frequencies. It will be apparent although a square wave oscillator is preferred the same effect can be achieved with other wave forms, for example some sinusoidal.

What I claim is:
1. A correlator comprising:
first input means for a first signal;

second input means for a second signal;
a source of predetermined alternating current (ac) signals having a predetermined frequency;
first mixer means connected to said first input means and said source to mix thereby the first signal and said ac signals in a manner to modulate said ac signals with said first signal to generate a mixed signal;
multiplying means connected to said first mixer means and to said second input means to multiply thereby said mixed signal and the second signal to generate a multiplying signal;
second mixer means connected to the multiplying means and to said source to mix thereby the multiplying signal and the said ac signals in a manner to generate a demodulated output signal; and
means for integrating the demodulated output signal from said second mixer means to thereby reduce the effects of any spurious signals associated with said first or said second signal.

2. A correlator as claimed in claim 1 wherein the frequency of said ac signals is substantially lower than the frequency of said first and second signals.

3. A correlator as claimed in claim 1 wherein the source of ac signals provides square wave ac signals.

4. A correlator as claimed in claim 1 wherein said first and second mixer means each comprise a double balanced mixer.

5. A correlator as claimed in claim 4 wherein said multiplying means comprise a double balanced mixer.

6. A correlator as claimed in claim 1, wherein said means for integrating comprises a chopper stabilized amplifier.

7. A correlator comprising:
first input means for inputting a signal to be correlated;
second input means for inputting a correlating signal;
a source of alternating current (ac) signals having a predetermined frequency;
modulator means connected to said first input means and said source for modulating said ac signals with said signal to be correlated and for generating a modulated signal;
multiplying means connected to said modulator means and second input means for multiplying said correlating signal by said modulated signal and for generating a multiplying signal; and
correlator output means for generating a correlation output signal, said correlator output means comprising spurious signal cancellation means, responsive to said source of ac signals and to said multiplying signal for reducing the effects of any spurious signal associated with said signal to be correlated or said correlating signal and for generating said correlation output signal, said spurious signal cancellation means including: demodulator means for mixing said multiplying signal and said ac signals in such a manner to generate a demodulated output signal and means responsive to said demodulated output signal for integrating said demodulated output signal to thereby reduce the effects of any spurious signal associated with said signal to be correlated or said correlating signal.

8. A correlator according to claim 7, wherein the frequency of said ac signals is substantially lower than the frequency of said signal to be correlated and the frequency of said correlating signal.

9. A correlator according to claim 7, wherein said source of ac signals provides square wave ac signals.

10. A correlator according to claim 7, wherein said means for integrating comprises a chopper stabilized amplifier.

11. A method of operating a correlation circuit to substantially reduce the effects of spurious signal components associated with received signals comprising the steps of:
(a) receiving a signal to be correlated;
(b) receiving a correlating signal;
(c) generating alternating current (ac) signals having a predetermined frequency;
(d) modulating said ac signals with said signal to be correlated and generating a modulated signal;
(e) multiplying said correlating signal by said modulated signal to generate a multiplying signal; and
(f) generating, in response to said ac signals and to said multiplying signal, a correlation output signal, whereby the effects of any spurious signal associated with said signal to be correlated or said correlating signal are reduced, said step of generating a correlation output signal including mixing said multiplying signal and said ac signals in a manner to generate a demodulated output signal, and integrating said demodulated output signal to thereby reduce the effects of any spurious signal associated with said signal to be correlated or said correlating signals.

12. A method according to claim 11, wherein the frequency of said ac signals is substantially lower than the frequency of said signal to be correlated and the frequency of said correlating signal.

13. A method according to claim 11, wherein said ac signals are square wave ac signals.

* * * * *